United States Patent [19]

Huisman et al.

[11] 4,308,289

[45] Dec. 29, 1981

[54] PROCESS FOR ADHESIVELY BONDING PEANUT HALVES

[75] Inventors: Eduard J. T. M. Huisman, Heerhugowaard; Rudy Vis, Zaandam, both of Netherlands

[73] Assignee: AKZO N.V., Arnhem, Netherlands

[21] Appl. No.: 53,992

[22] Filed: Jul. 2, 1979

[30] Foreign Application Priority Data

Jul. 6, 1978 [NL] Netherlands .................. 7807313

[51] Int. Cl.$^3$ ............................................... A23L 1/36
[52] U.S. Cl. ...................................... 426/274; 426/285; 426/295; 426/632; 426/93
[58] Field of Search .................. 426/93, 94, 296, 292, 426/632, 289, 294, 295, 290, 274, 285; 118/19

[56] References Cited

U.S. PATENT DOCUMENTS

| | | | |
|---|---|---|---|
| 1,307,090 | 6/1919 | Dunham | 426/632 |
| 1,876,224 | 9/1932 | Harding | 118/19 |
| 3,314,800 | 4/1967 | Noznick | 426/93 |
| 3,448,718 | 6/1969 | Green et al. | 118/19 |
| 3,544,332 | 12/1970 | Leebens | 426/295 |
| 3,671,266 | 6/1972 | Cooper et al. | 426/290 |
| 4,053,650 | 10/1977 | Chino et al. | 426/93 |
| 4,085,230 | 4/1978 | Green | 426/632 |
| 4,161,545 | 7/1979 | Green et al. | 426/632 |

FOREIGN PATENT DOCUMENTS

| | | | |
|---|---|---|---|
| 2601474 | 7/1976 | Fed. Rep. of Germany | 426/93 |
| 51-617 | 1/1976 | Japan | 426/93 |
| 7213725 | 12/1972 | Netherlands | 426/93 |
| 1404887 | 9/1975 | United Kingdom . | |

*Primary Examiner*—Joseph M. Golian
*Assistant Examiner*—George C. Yeung
*Attorney, Agent, or Firm*—Stevens, Davis, Miller & Mosher

[57] ABSTRACT

An improved process is provided for treating skinned peanuts with an edible powder. In the improved process, peanuts including those peanuts which have split into halves are rotated relative to each other while associated with a substantially dry edible powder until the flat faces of half peanuts have an edible powder adhering thereto and two half peanuts become bonded together face to face to form a whole peanut. A tumbler having a drum disposed to rotate about a substantially horizontal axis and having a roughened interior surface is preferably used for rotating the peanuts.

13 Claims, No Drawings

PROCESS FOR ADHESIVELY BONDING PEANUT HALVES

This invention relates generally to a method of treating peanuts with an edible powder.

A method for coating peanuts with an edible material is disclosed in British Patent Specification No. 1,404,887. The disclosed method involves successively coating peanuts with a starch-containing substance and then frying them in oil. The starch-containing coating is to contain flour and water in a weight ratio within the range of 75:25 to 55:45. Water is required to obtain a sufficiently coherent coating. Such a coating is applied to the peanuts in a coating pan. According to the disclosure in the British Patent Specification, peanuts used in the preparation of food products, more particularly snack food products, are as a rule first subjected to a roasting treatment. For some purposes the peanuts, after they have been skinned, are subjected to a deep-frying treatment.

During these treatments, a large portion of the peanuts will fall apart into two halves. It has been found that by successively roasting, skinning and deep-frying whole peanuts, mixtures are obtained containing 40 to 80 percent by weight of whole peanuts and 20 to 60 percent by weight of half peanuts. Half peanuts are unsuitable for further processing into certain food products such as coated peanuts. This problem is generally solved by separating the half peanuts from the whole ones by screening them out. The half peanuts are then used for other purposes.

A disadvantage is that a large percentage of the peanuts used for the preparation of the food product are lost. Moreover, the disclosed method causes a substantial rise in cost in the that the value of the resulting half peanuts is very much below that of the whole peanuts with which the preparation is started.

It is therefore an object of the present invention to provide a process for treating peanuts which does not lead to the waste of half peanuts.

The foregoing object and others are accomplished in accordance with this invention, generally speaking, by rotating skinned peanuts by means of a moving surface, provided with irregularities, adding a substantially dry edible powder to the peanuts and rotating the peanuts without adding water or an aqueous solution.

Surprisingly, it has been found that use of the method of the invention results in only a small number of half peanuts being left in the apparatus. Moreover, this method does not display the drawbacks of the known method in that there is no longer any need for screening out half peanuts and all peanuts are suitable for processing into a food product such as coated peanuts.

In carrying out the present method, it was established that originally a large portion of the peanuts fall apart into two halves under the influence of mechanical forces. Subsequently, agglomeration took place, during which the half peanuts stuck to the flat side of the other half peanuts. The bond thus formed was found to be so strong that it was maintained during further treatments.

When the treatment is carried out in the absence of water or an aqueous solution, the peanuts are not provided with a coating of the type described in the above-identified Patent Specification and do stick together. Therefor the present treatment cannot be considered a conventional coating process.

The present method may be applied to whole and/or broken peanuts. By broken peanuts are also to be understood chopped peanuts. It is preferred, however, that the skinned peanuts should be entirely or virtually entirely made up of half peanuts.

Applying the present method only to half peanuts produces peanuts which bear a close resemblance to, and as far as all further treatments are concerned, are identical with whole peanuts. In view of the relatively low cost price of half peanuts, this method leads to great saving in costs.

The method according to the invention may be carried out by means of an apparatus comprising two rolls positioned at different levels and an upwardly moving slack conveyor belt having a rough surface which runs between the two rolls.

During the treatment, the peanuts are entrained in an upward direction. Subsequently, the peanuts fall back, as a result of which they are set into rotation relative to each other. It is preferred, however, that the method of the invention should be carried out in a rotating drum having an internal surface which is at least partially provided with irregularities. The surface should be such that during rotation, the peanuts are entrained by the wall of the drum. If the present method should be carried out in a rotating drum whose inside is provided with a smooth surface, then the rotating movement of the peanuts relative to each other is too little to result in the effect obtained by the present invention.

The rotating drum may be provided with irregularities in various ways. For example, the inside surface may be entirely or partially provided with studs, ridges, corrugations, strips of a coarse material, etc., or the inside of the drum may be roughened by providing it with a rough coating.

For instance, the inside wall surface may be coated with river sand, porcelain granules, rubber granules, plastic particles or other polymer particles, etc. It is preferred, however, that the inside of the rotating drum should be entirely or partially coated with silicon carbide (carborundum) or the like granules.

Various types of pans may be used as a rotating drum. It is preferred, however, that the rotating drum be a coating pan. In a coating operation such a pan is generally positioned so the axis of rotation makes an angle of 10 to 40 degrees with the horizontal. It was found that in such a pan position, the size of the agglomerated peanuts is not uniform throughout the pan. In the front part of the pan, a larger number of relatively big agglomerates (triplets, quadruplets, quintuplets, etc.) were formed than in the back. It was found that also the percentage of half nuts left in the back is higher than in the front. As a result of this segregation effect, a nonuniform product is formed which is objectionable for some uses.

It has been found that no segregation takes place if the rotating pan is so positioned that the axis of rotation is horizontal. Even a deviation of as small as 10 degrees will lead to a nonuniform product. Moreover, it was found that as the pan axis was placed more horizontal, the agglomeration process proceeded more quickly.

As pointed out above, in accordance with the invention, the edible powder added to the peanuts is dry and the treatment is carried out without adding water or an aqueous solution. During the treatment, the peanuts became somewhat greasy as a result of high internal friction. Although the action of the dry powder is not quite clear, it seems probably that the powder together with the fat of the peanuts forms an adhesive.

The half peanuts adhere to each other only with their flat sides, unless there is also a flat surface on the convex side of the peanut. In that case, triplets, quadruplers and quintuplets may form. The bond is so strong that during the further treatments it is seldom broken. This bond is even stronger than that of whole "natural" peanuts. If no powder is added, big or very big agglomerates of peanuts are formed which easily fall apart. This indicates that the addition of powder is of essential importance to prepare twins predominantily and very few, if any, big or very big agglomerates. The absence of water is desirable in that it prevents the peanuts from being provided with such a thick coating which interferes with the agglomeration process.

The powder may be added to the peanuts all at once or in several stages. If the powder is added all at once, then it should be done after the peanuts have become somewhat greasy. It is preferred, however, that the edible powder is added gradually during the treatment. By gradual addition is to be understood both continuous and batch-wise (intermittent) feeding of powder.

It has been found that gradual addition of powder during the treatment leads to uniform agglomerates displaying a narrow particle size distribution. The product practically entirely consists of twins. Triplets, quadruplets and quintuplets are seldom found to occur.

The edible powder may be any suitable powder selected from a large variety of substances. Suitable substances, for example, include sugar, cocoa, silica powder, and farinas such as flours, starches, physically and/or chemically modified starches, and milk proteins. It is, of course, also possible to contain one or more flavoring and/or aroma-imparting ingredients. The present method may offer particular advantages if the peanuts are thereafter provided with a coating and subsequently deep fried. For if flavoring ingredients ae contained in that coating, they may to a large extent get lost during deep frying as a result of the high frying temperature.

The present method does not have this drawback in that said ingredients are better protected and therefore exposed to a less high temperature.

To improve adhesion, a small amount of edible adhesive as well as an edible powder may be added during the treatment. To that end, use may be made of oils and fats and suspensions of edible powders in oils and fats. Adhesives also may be prepared in situ.

The peanuts obtained by the present method can be used immediately as a food product. For instance, deep fried peanuts to which during treatment in the rotating pan a mixture of powdered sugar and cocoa has been added are fit for immediate consumption. Moreover, peanuts obtained after the agglomeration process may serve as a starting product in the preparation of a food product. Such peanuts can be used for all the purposes for which at present whole peanuts are employed.

It is preferred that in a manner known in itself these peanuts should be provided with an edible coating. The uniform and somewhat roughened product formed as a result of agglomeration is found to be excellently suitable for coating. The present peanuts can, in a known way, be coated in a coating pan. Coating may be carried out in the same pan as in which the agglomeration takes place. It is preferred that the peanuts should be coated with a flour. As indicated above, a coating process using a flour always takes place in the presence of water.

As examples of suitable coating agents may be mentioned modified or unmodified starches and flours. To the flour or flour mixture may be added commonly employed ingredients such as flavoring agents, aroma imparting agents, preservatives and antioxidants.

After the peanuts thus coated have been deep fried, the final snack food is obtained. The peanuts thus provided with an edible coating also form an embodiment of the present invention. This also applies to peanuts coated with chocolate, sugar or other substance.

The following examples serve to illustrate the present invention.

EXAMPLE 1

Thirty kg of deep fried half peanuts were transferred to a coating pan having an internal surface coated substantially entirely with silicon carbide particles (particle size about 2 mm). The axis of rotation of the pan was at an angle of 30 degrees with the horizontal and the rotary speed was 23 revolutions per minute.

Towards the end of the treatment, which lasted 8 minutes, 3 kg of manioc flour were added. The experiment was repeated 4 times, but in such a way that the treatments lasted 11, 14, 16 and 20 minutes, respectively. The following table indicates how the weight percentage of half nuts in the tumbler drum decreases as a function of time.

| Duration of Treatment (in minutes) | Weight percent of half peanuts |
| --- | --- |
| 8 | 96.8 |
| 11 | 89.5 |
| 14 | 69.3 |
| 16 | 33.2 |
| 20 | 26.4 |

The peanuts obtained after a treatment of 20 minutes contained 73.6 percent by weight of composite peanuts (agglomerates). These composite peanuts contained 57.1; 34.8; 6.8; and 1.2 percent by weight of twins, triplets, quadruplets and quintuplets, respectively. The above experiment shows the agglomeration effect obtained by the process according to the invention.

EXAMPLE 2

In two successive experiments, the coating pan described in Example 1 was so positioned that the axis of rotation made an angle of 12 and 0 degrees, respectively, with the horizontal.

In the two experiments, 30 kg of deep fried half peanuts were brought into the coating pan. In both cases, the treatment lasted 20 minutes and the number of revolutions was 23 per minute and 3 kg of manioc four were added to the peanuts towards the end of the treatment.

After the treatment, a sample was taken from the front part, the middle part and the back part of the drum and subsequently analyzed. Both the percentage by weight of half peanuts left and the particle size distribution of the agglomerates were determined.

The following table shows the results:

| Angle of axis of rotation (degrees) | Sampling spot | Wt % half peanuts | Particle size distribution of agglomerates[1] in wt. % | | | |
| --- | --- | --- | --- | --- | --- | --- |
| | | | >11.2 mm | 11.2-10 mm | 10-8 mm | <8 mm |
| 12 | front | 2.8 | 38.3 | 27.0 | 31.7 | 0.1 |
| | middle | 15.0 | 21.1 | 25.0 | 38.8 | 0.1 |

-continued

| Angle of axis of rotation (degrees) | Sampling spot | Wt % half peanuts | Particle size distribution of agglomerates[1] in wt. % | | | |
|---|---|---|---|---|---|---|
| | | | >11.2 mm | 11.2-10 mm | 10-8 mm | <8 mm |
| | back | 25.9 | 7.8 | 16.4 | 49.9 | 0.1 |
| 0 | front middle back | 22.9 | 9.4 | 23.3 | 44.1 | 0.4 |

[1] The agglomerates were obtained after screening out the half peanuts.

The above results show that at an angle of as small as 12 degrees, considerable segregation takes place. Only if the axis of rotation is horizontal is a product obtained having a narrow particle size distribution and a uniform composition throughout the drum.

EXAMPLE 3

In two successive experiments, the effect on the agglomeration process of gradually adding flour was determined. In each experiment, 30 kg of deep fried half peanuts were brought into the tumbler drum as described in Example 1.

In either case, the position of the axis of rotation was horizontal, the duration of the experiment was 30 minutes, and the number of revolutions 23 per minute.

Towards the end of the first experiment (I) 3 kg of manioc flour were fed into the rotating coating pan.

During the second experiment (II) 3 kg of manioc flour were added to the peanuts in 4 equal portions. The flour was added after 7, 12, and 16 minutes and towards the end of the treatment.

Upon completion of the treatment, the percentage of remaining half peanuts and the particle size distribution of the agglomerates were determined.

The results are summarized in the following table:

| Experiment | Wt. % half peanuts | Particle size distribution of agglomerates[1] in wt % | | | |
|---|---|---|---|---|---|
| | | >11.2 mm | 11.2-10 mm | 10-8 mm | <8 mm |
| I | 23 | 12.1 | 30.2 | 57.2 | 0.5 |
| II | 16 | 1.3 | 10.9 | 87.4 | 0.4 |

[1] The agglomerates were obtained after screening out the half peanuts.

The above data show that the flour is preferably added gradually during the treatment. In that case, the product obtained displays a narrower particle size distribution and fewer half peanuts are left than when the flour is added all at once.

EXAMPLE 4

The method according to the invention was successively applied to deep fried half peanuts, roasted half peanuts and a mixture of 50% (by weight) of deep fried whole and 50% (by weight) of deep fried half peanuts.

In each experiment, 30 kg of these peanuts were treated in the coating pan as described in Example 1.

In all cases, the axis of rotation of the drum was horizontal, the duration of the treatment of the deep fried peanuts 30 minutes and that of the roasted peanuts 100 minutes. The speed of the drum was 23 revolutions per minute.

In each experiment, a total of 3 kg of manioc flour were intermittently added to the peanuts. With the deep fried peanuts, the first flour feed was after 5 minutes, with the roasted peanuts after 30 minutes. Subsequently, towards the end of the treatments, an amount of flour was added to the deep fried peanuts every two minutes and to the roasted peanuts every 15 minutes.

Upon completion of the three treatments, the percentage of half peanuts and the particle size distribution of the resulting agglomerates were determined.

The results are given in the table below. For comparison also, the particle size distribution of deep fried whole peanuts is included in this table.

| Starting product | Wt. % half peanuts | Particle size distribution of agglomerates[1] in wt % | | | |
|---|---|---|---|---|---|
| | | >11.2 mm | 11.2-10 mm | 10-8 mm | <8 mm |
| deep fried half peanuts | 6 | 1.7 | 15.7 | 82.0 | 0.7 |
| roasted half peanuts | 6 | 1.5 | 6.3 | 90.4 | 1.9 |
| 50 wt % deep fried half + 50 wt % deep fried whole peanuts | 6 | 1.4 | 7.7 | 90.4 | 0.4 |
| deep fried whole peanuts | — | 0.0 | 3.9 | 95.4 | 0.7 |

[1] The agglomerates were obtained after screening out the half peanuts.

The above results show that the method according to the invention can be applied equally successfully to various starting products. The percentage of remaining half peanuts is small in all three cases. The particle size distribution of the resulting agglomerates strongly resembles that of whole peanuts.

EXAMPLE 5

Thirty kg of roasted half peanuts were charged into a coating pan as described in Example 1. The position of the axis of rotation of the drum was horizontal. The duration of the treatment was 100 minutes, and the rotary speed 23 revolutions per minute.

Thirty minutes after the start of the treatment, 3 kg of manioc flour were intermittently added to the peanuts. The resulting product had the following particle size distribution:

| Particle size distribution | Wt. % |
|---|---|
| <6 mm (= half peanuts) | 5.9 |
| 6-8 mm | 1.8 |
| 8-10 mm | 85.0 |
| 10-11.2 mm | 5.9 |
| 11.2 mm | 1.4 |

Subsequently, use being made of the same coating pan rotating at the same speed of 23 revolutions per minute, over a period of 6 minutes, 23.3 kg of a flour mixture and 14.9 kg of an aqueous solution were evenly and simultaneously added to the product obtained. The flour mixture consisted of 85 percent by weight of manioc flour and 15 percent by weight of pre-cooked starch. The aqueous solution contained 71% water, 13% salt, 15% sugar, 3.0% flavoring agents.

Upon completion of the coating operation, the final snack food was obtained by deep frying. The quality of the resulting snack food varied very little, if any, from that of snack foods prepared from whole "natural" peanuts.

Although the invention has been described in detail for the purposes of illustration, it is to be understood that such detail is solely for the purpose of illustration and that variations can be made therein without departing from the spirit and scope of the invention except as it may be limited by the claims.

What is claimed is:

1. A process for salvaging peanuts which have split into halves, which comprises rotating skinned peanuts containing peanuts split into halves in a drum having its axis substantially horizontal and having a roughened interior surface, adding a substantially dry edible powder selected from the group consisting of sugar, cocoa, silica powder, flour, unmodified starch, physically modified starch, chemically modified starch, milk protein and mixtures thereof to the peanuts and continuing the rotation with the dry edible powder without addition of water or an aqueous solution thereto until half-peanuts are bonded together face to face simulating whole peanuts.

2. A process for coating peanuts, wherein the peanuts to be coated were obtained according to the process of claim 1 and the coated product is deep fried.

3. A method for adhesively bonding skinned peanut halves together which comprises tumbling in a rotating drum having an irregular surface said peanut halves with a substantially dry edible powder selected from the group consisting of sugar, cocoa, silica powder, flour, unmodified starch, physically modified starch, chemically modified starch, milk protein and mixtures thereof under substantially anhydrous conditions until the edible powder mixes with fat and protein of the peanuts to form an adhesive which bonds pairs of the half peanuts together flat face to flat face to form products which appear to be whole peanuts.

4. The method of claim 3 wherein said tumbling is continued until the resulting peanuts become coated with the said edible powder, protein and fat mixture.

5. The method of claim 3 wherein the treatment is carried out in a rotating drum having an interior surface which is entirely or partially provided with a rough surface.

6. The method of claim 5 wherein the inside of the rotating drum is entirely or partially coated with silicon carbide particles.

7. The method of claim 5 wherein the rotating drum is positioned whereby the axis of rotation is horizontal.

8. The method of claim 6 wherein the rotating drum is positioned whereby the axis of rotation is horizontal.

9. The method of claim 3, 6 or 7 wherein the edible powder is gradually added during the treatment.

10. The method of claim 5 wherein the edible powder is added gradually during the treatment.

11. The method of claim 3 wherein the edible powder contains one or more flavor or aroma imparting agents.

12. The method of claim 5 wherein the edible powder contains a flavor imparting agent.

13. The method of claim 5 wherein the edible powder contains an aroma imparting agent.

* * * * *